United States Patent [19]

Arakawa et al.

[11] Patent Number: 4,564,668
[45] Date of Patent: Jan. 14, 1986

[54] PROCESS FOR PREPARATION OF POLYVINYLENE SULFIDE

[75] Inventors: Tatsumi Arakawa; Masaru Ozaki; Yukihiro Ikeda, all of Fuji, Japan

[73] Assignee: Director-General of Agency of Industrial Science and Technology

[21] Appl. No.: 658,996

[22] Filed: Oct. 9, 1984

[30] Foreign Application Priority Data

Mar. 31, 1984 [JP] Japan ................................. 59-62157

[51] Int. Cl.$^4$ ............................................ C08G 75/14
[52] U.S. Cl. .................................................... 528/388
[58] Field of Search ........................................ 528/388

[56] References Cited

U.S. PATENT DOCUMENTS

| 1,890,191 | 12/1932 | Patrick | 528/388 |
| 1,923,392 | 8/1933 | Patrick | 528/388 |
| 2,485,107 | 10/1949 | Patrick et al. | 528/388 |
| 3,354,129 | 11/1967 | Edmonds . | |

FOREIGN PATENT DOCUMENTS 580184  8/1946  United Kingdom .

OTHER PUBLICATIONS

Noller, Chemistry of Organic Compounds, W. B. Saunders Company, Philadelphia, pp. 88 and 89, 1965.

Primary Examiner—Melvyn I. Marquis
Attorney, Agent, or Firm—Cushman, Darby & Cushman

[57] ABSTRACT

Polyvinylene sulfide is prepared in a high yield by reacting 1,2-dichloroethylene with sodium sulfide in the presence of dimethyl sulfoxide.

2 Claims, No Drawings

PROCESS FOR PREPARATION OF POLYVINYLENE SULFIDE

BACKGROUND OF THE INVENTION

(1) Field of the Invention

The present invention relates to a process for the preparation of polyvinylene sulfide.

(2) Description of the Prior Art

Polyvinylene sulfide is a sulfur-containing primary polymer having structural units represented by the formula —CH=CH—$S_n$, and it has inherent electical and thermal properties and is valuable as an organic polymeric semiconductor or as an electric or electronic material.

Polyvinylene sulfide is a kind of the known polyvinylene chalcogenide. As the process for the preparation of this polymer, Ser. No. 471,152 ( hereinafter referred to as "prior application") proposes a process comprising reacting an ethylene dihalide with sodium sulfide in a solvent at a temperature of 60° to 250° C.

However, according to the process of the prior application, the yield is low and occurrence of thermal decomposition reaction or other side reaction is conspicuous. Furthermore, it often happens that the formed polymer contains therein an undesirable structure. For example, when dichloroethylene is reacted with sodium sulfide at an elevated temperature higher than 80° C. in N-methyl-2-pyrrolidone as the solvent, the amount of formed polyvinylene sulfide in the obtained product is small and a salient amount of sulfur is formed. From the results of the gel permeation chromatography analysis, it has been found that the amount of the polymeric substance contained in the product is small.

As is seen from the foregoing description, in the process of the prior application, the yield and purity are low because of occurrence of thermal decomposition reaction and side reaction and the unstability of the starting monomer, and therefore, improvements have been desired.

SUMMARY OF THE INVENTION

From the researches of polycondensation of an ethylene dihalide with sodium sulfide, we have now found that when dimethyl sulfoxide is used as the reaction solvent, polyvinylene sulfide is obtained in a high yield. It also has been found that if anhydrous sodium sulfide is used as the starting sodium sulfide, polyvinylene sulfide having a high purity can be obtained. Furthermore, it has been found that if the reaction is carried out at a temperature of 10° to 55° C., occurrence of thermal decomposition and side reaction can be desirably controlled. The present invention has been completed based on these findings.

Accordingly, it is a primary object of the present invention to provide a process by which polyvinylene sulfide of a high purity can be prepared in a high yield.

In accordance with the present invention, there is provided a process for preparing polyvinylene sulfide which comprises reacting, 1,2-dichloroethylene ClHC=CHCD with sodium sulfide in the presence of dimethyl sulfoxide.

DESCRIPTION OF THE PREFERRED EMBODIMENTS

In accordance with one preferred embodiment of the present invention, there is provided a process for preparing polyvinylene sulfide having a high purity in a high yield, in which anhydrous sodium sulfide is used as the starting sodium sulfide.

In accordance with another preferred embodiment of the present invention, there is provided a process for preparing polyvinylene sulfide, in which the reaction is carried out at a temperature of 10° to 55° C. whereby occurrence of decomposition reaction or side reaction is controlled.

Any of cis- and trans-isomers and mixtures thereof may be used as 1,2-dichloroethylene in the present invention. As sodium sulfide, there can be mentioned a hydrous salt and an anhydrous salt. When a hydrous salt, for example, $Na_2S.9H_2O$, is used, a saturated carbon-to-carbon bond such as a methylene group and an undesirable structure such as a carbonyl group are liable to be included in the main chain of the formed polymer. Accordingly, in order to obtain polyvinylene sulfide having a pure structure, it is preferred that the anhydrous salt be used.

In the process of the present invention, the polymerization reaction is carried out in the presence of dimethyl sulfoxide, and in order to increase the reaction rate, it is preferred that only dimethyl sulfoxide be used as the reaction solvent.

In the dimethyl sulfoxide solvent, the condensation reaction of 1,2-dichloroethylene with sodium sulfide is advanced at a high efficiency, and sodium chloride as the by-product is stoichiometrically formed and is precipitated in the liquid reaction mixture. The thus-prepared polyvinylene sulfide is recovered in the form of a whitish yellow or yellow powder in a high yield by removing sodium chloride from the liquid reaction mixture by filtration and pouring the filtrate into a large amount of methanol or water.

An optimum reaction temperature varies depending upon the physical and chemical properties of the solvent used, such as the melting point, boiling point and stability, and the stability of the starting substance or the product in the solvent. In the process of the present invention, the reaction is carried out at a temperature of 10° to 55° C., preferably 20° to 50° C. If the reaction temperature is lower than 10° C., the advance of the reaction is very slow. In contrast, if the reaction temperature is higher than 55° C., undesirable decomposition of the starting substance is readily caused and the product formed has an undesirable structure. For example, when dichloroethylene is reacted with sodium sulfide in dimethyl sulfoxide as the solvent at a reaction temperature of 60° C., the yield of polyvinylene sulfide formed in the liquid reaction product is very low, and by the gel permeation chromatography analysis, it is confirmed that elementary sulfur formed by thermal decomposition of a part of the starting substance or obtained product is present.

The reaction time is not particularly critical, but in order to obtain the intended product in a high yield, the optimum reaction time is appropriately determined while taking the properties of the solvent, the stability of the product and the reaction temperature into consideration. When the reaction is carried out at a temperature of 10° to 55° C., the reaction time should be at least one hour. In order to increase the yield, it is preferred that the reaction time be prolonged at a lower reaction temperature and the reaction time be shortened at a higher reaction temperature.

It is preferred that the reaction be carried out with vigorous stirring.

As hereinbefore mentioned, in the dimethyl sulfoxide solvent, the condensation reaction of 1,2-dichloroethylene with sodium sulfide is advanced at a high efficiency and sodium chloride as the by-product is stoichiometrically formed and precipitated in the liquid reaction mixture. Polyvinylene sulfide can be recovered in a high yield in the form of a whitish yellow or yellow powder by removing sodium chloride from the liquid reaction mixture by filtration and pouring the filtrate into a large amount of methanol or water.

When this powdery product is analyzed by the infrared absorption spectrum, there are observed an absorption due to the stretching vibration of olefinic C—H, an absorption due to the stretching vibration of C=C in —S—CH=CH—S— and absorptions of out-of-plane and in-plane deformation vibrations of olefinic C—H.

When the powdery product is directly subjected to the solid-state $^{13}$C—NMR spectrum analysis, a signal of the alkene carbon is clearly observed.

When hydrous sodium sulfide is used as the starting sodium sulfide, from the infrared absorption spectrum and NMR spectrum, it is confirmed that a saturated C—H bond such as a methylene group —CH$_2$— is present in the formed polymer. Especially in the infrared absorption spectrum, an absorption considered to be due to the carboxyl group present in the formed polymer is observed at 1,680 to 1,700 cm$^1$.

When an anhydrous salt is used as the starting sodium sulfide, polyvinylene sulfide having a high purity and a desirable structure free of the saturated C—H bond or carbonyl group can be obtained.

Polyvinylene sulfide prepared according to the above-mentioned process is insoluble or hardly soluble at room temperature in water, methanol, toluene, chloroform, 1,2-dichloroethane, carbon tetrachloride, carbon disulfide, chlorobenzene, 1,2,4-trichlorobenzene and tetrahydrofuran, but the polymer is partially soluble in dimethyl sulfoxide. This solubility characteristics indicates that the obtained polymer has a high molecular weight.

The advantages of the process of the present invention are summarized as follows.

(1) Since the reaction is carried out in dimethyl sulfoxide or in the presence of dimethyl sulfoxide, polyvinylene sulfide can be obtained in a high yield.

(2) When anhydrous sodium sulfate is used as the starting substance, polyvinylene sulfide having a high purity can be obtained.

(3) When the reaction is carried out at a relatively low temperature of 10° to 55° C., thermal decomposition or other side reaction can be avoided or minimized.

By dint of the peculiar structure, polyvinylene sulfide prepared according to the process of the present invention has characteristic electric and thermal properties. More specifically, the polymer inherently has semi-conductive properties, and if the polymer is modified with an electron acceptor such as a halogen or an electron donor such as an alkali metal, the electric conductivity is extremely increased. The polymer having such properties is valuable as an organic polymeric semiconductor or an electric or electronic material.

The present invention will now be described by the following examples.

EXAMPLE 1

The inside atmosphere of a polymerization vessel having a strong stirrer and a good sealing property was substituted with argon gas, and 5.06 g of anhydrous sodium sulfide Na$_2$S was charged in the polymerization vessel. The reaction vessel was sealed and a liquid mixture comprising 6.29 g of trans-1,2-dichloroethylene and 30 ml of dimethyl sulfoxide was dropped into the polymerization vessel, and the mixture was violently stirred at 40° C. for 72 hours. Sodium chloride formed as the by-product was removed from the liquid reaction mixture by filtration, and the filtrate was made weakly acidic by an aqueous HCl solution and poured into 600 ml of methanol to obtain a whitish brown precipitate. The precipitate was washed with water, methanol and then with hot chloroform to obtain 3.2 g of a yellow powder. The yield was 84%. The powder was insoluble or hardly soluble at room temperature in chloroform, 1,2-dichloroethane, carbon tetrachloride, chlorobenzene, 1,2,4-trichlorobenzene, toluene, tetrahydrofuran and carbon disulfide, but was partially soluble in dimethyl sulfoxide. When the powder was subjected to the solid-state $^{13}$C—NMR spectrum analysis, only a signal of the alkene carbon was obserbed at 122.2 ppm. In the infrared absorption spectrum of the powder, there were observed an absorption due to the stretching vibration of olefinic C—H at 3025 cm$^{-1}$, an absorption due to the stretching vibration of C=C in —S—CH=CH—S— at 1530 to 1570 cm$^{-1}$, absorptions due to the in-plane deformation vibrations of C—H of the cis- and trans-olefins at 1280 and 1240 cm$^{-1}$, respectively, and absorptions due to the out-of-plane deformation vibrations of C—H of the cis- and trans-olefins at 640 and 920 cm$^{-1}$, respectively. Futhermore, a characteristic sharp absorption was observed at 810 cm$^{-1}$. Peaks due to impurities other than the polymeric structure—CH=CH—S$_n$ were not observed or were observed only to a negligible extent in the $^{13}$C—NMR spectrum or the infrared absorption spectrum.

EXAMPLE II

A reaction vessel having a good sealing property was charged with 5.06 g of anhydrous sodium sulfide and the inside atmosphere was replaced by argon gas. The reaction vessel was sealed and a liquid mixture comprising 6.29 g of cis-1,2-dichloroethylene and 30 ml of dimethyl sulfoxide was dropped into the reaction vessel and the mixture was violently stirred. The temperature of the reaction mixture was temporarily elevated by the reaction heat, but after generation of the reaction heat ceased, the reaction temperature was set at 40° C. and stirring was continued for 12 hours. Sodium chloride was removed from the liquid reaction mixture by filtration, and the filtrate was acid-treated and poured into 600 ml of methanol to form a whitish yellow precipitate. The precipitate was washed with water, methanol and then hot chloroform to obtain 3.5 g of a whitish yellow powder. The yield was 92%. The powder was insoluble or hardly soluble at room temperature in chloroform, 1,2-dichloroethane, carbon tetrachloride, 1-chloronaphthalene, toluene and carbon disulfide, but was soluble in dimethyl sulfoxide at a temperature of at least 70° C. When the powder was subjected to the solid-state $^{13}$C-NMR spectrum analysis, only a signal of the alkene carbon was observed at 121.9 ppm. In the infrared absorption spectrum, there were observed absorptions due to the stretching vibration of olefinic C—H, the stretching vibration of C=C, the in-plane deformation vibrations of C—H, of cis- and trans-olefins and the out-of-plane deformation vibrations of C—H of trans- and cis-olefins at 3050, 1540, 1280, 1240, 920 and 640 cm$^{-1}$, respectively. Futhermore, a characteristic sharp absorption was observed at 810$^{-1}$. The absorptions at 1280 and 640 cm$^{-1}$ were much stronger than those of the polymer obtained by using as the starting substance trans-1,2-dichloroethylene as in Example I. Thus, it was confirmed that the formed polymer was rich in the cis-structure. Furthermore, peaks due to impurities were not observed or were observed only to a negligible extent in the $^{13}$C—NMR spectrum or infrared absorption spectrum, as in case of the polymer obtained in Example I.

EXAMPLE III

The inside atmosphere of an autoclave equipped with a stirrer was substituted with argon gas, and 5.06 g of anhydrous sodium sulfide was charged in the autoclave and then the autoclave was sealed. A liquid mixture comprising 6.29 g of trans-1,2-dichloroethylene and 30 ml of dimethyl sulfoxide was dropped into the autoclave and the mixture was violently stirred at 80° C. for 3 hours. Sodium chloride formed as the by-product was removed from the liquid reaction mixture by filtration and the filtrate was acid-treated and poured in 600 ml of methanol to obtain 1.9 g of a yellowish brown powder of polyvinylene sulfide. The yield was 50%.

EXAMPLE IV

The inside atmosphere of a reaction vessel equipped with a stirrer and having an inner capacity of 50 ml was substituted with argon gas, and 5.06 g of anhydrous sodium sulfide was charged in the reaction vessel. Then, the reaction vessel was sealed and a liquid mixture comprising 6.29 g of trans-1,2-dichloroethylene and 30 ml of dimethyl sulfoxide was dropped into the reaction vessel. The reaction was immersed in a cold water bath maintained at 5° C. and the reaction was conducted for 7 days with violent stirring. The liquid reaction mixture was acid-treated and poured into 600 ml of methanol to obtain 1.7 g of a whitish brown powder of polyvinylene sulfide. The yield was 40%.

EXAMPLE V

The inside atmosphere of a reaction tube of a polymerization vessel equipped with a stirrer was substituted with argon gas, and 5 g of sodium sulfide nonahydrate Na$_2$S.9H$_2$O was charged into the reaction tube. The reaction tube was sealed, and a liquid mixture comprising 2 g of trans-1,2-dichloroethylene and 30 ml of dimethyl sulfoxide was dropped into the reaction tube. The mixture was vigorously stirred at 40° C. for 70 hours. Sodium chloride was removed from the liquid reaction mixture by filtration, and the filtrate was poured into 600 ml of methanol to form a whitish brown precipitate. The precipitate was washed with water and then methanol to obtain 1.1 g of a yellow powder. The yield was 92%. The product was soluble in chloroform. When the product was subjected to the $^1$H—NMR spectrum analysis, a strong signal attributed to the olefinic proton was observed at 6.3 ppm and a weak signal attributed to the alkanic proton was observed in the vicinity of 1 to 3 ppm. In the infrared absorption spectrum of the product, there were observed absorptions due to the stretching vibration of olefinic C—H at 3060 and 3030 cm$^{-1}$, an absorption of the stretching vibration of C=C in —S—CH=CH—S— at 1530 to 1560 cm$^{-1}$ and absorptions due to the out-of-plane deformation vibrations of C—H of the trans-olefin and cis-olefin at 910 and 650 cm$^{-1}$, respectively. Furthermore, a characteristic sharp absorption was observed at 805 cm$^{-1}$. Moreover, there were observed weak absorptions attributed to the stretching vibrations of saturated C—H at 2920 and 2960 cm$^{-1}$ and a weak absorption attributed to the stretching vibration of C=O of the carbonyl at 1690 cm$^{-1}$. These weak absorptions indicated the presence of impurities. The formed polymer was soluble in chloroform, and when a solution of the polymer in chloroform was cast on a slide glass sheet, a film could be formed. The electric conductivity of the film was $9.3 \times 10^{-11}$ S.cm$^{-1}$. When the film was contacted with iodine vapor at room temperature, the electric conductivity was increased to $1.3 \times 10^{-3}$ S.cm$^{-1}$.

We claim:

1. A process for the preparation of polyvinylene sulfide which comprises reacting 1,2-dichloroethylene of the formula: ClHC=CHCl with sodium sulfide in the presence of dimethyl sulfoxide at a temperature of from 10° C. to 55° C.

2. A process according to claim 1, wherein anhydrous sodium sulfide is used as the starting sodium sulfide.

* * * * *